Dec. 6, 1966    J. HARTMANN ETAL    3,290,572
DIRECT CURRENT MOTOR WITH TRANSISTORIZED POWER SUPPLY
Filed July 6, 1964    2 Sheets-Sheet 1

Inventors:
Julian Hartmann
Helmut Moczala
By Spencer & Kaye
ATTORNEYS

Dec. 6, 1966    J. HARTMANN ETAL    3,290,572
DIRECT CURRENT MOTOR WITH TRANSISTORIZED POWER SUPPLY
Filed July 6, 1964    2 Sheets-Sheet 2
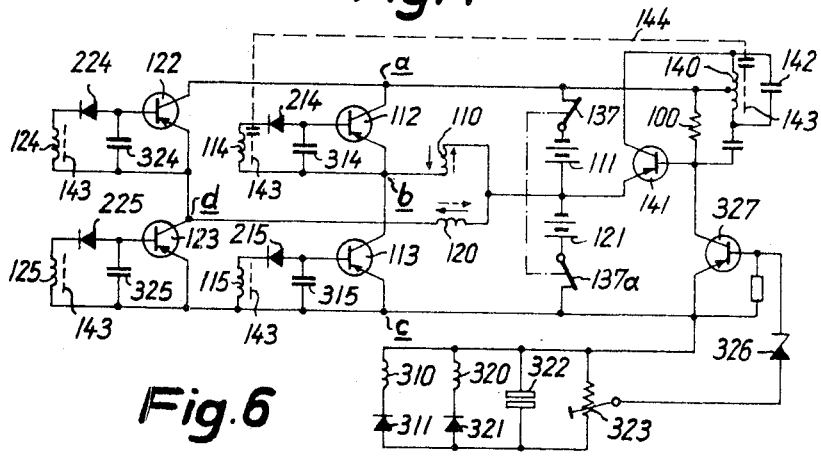
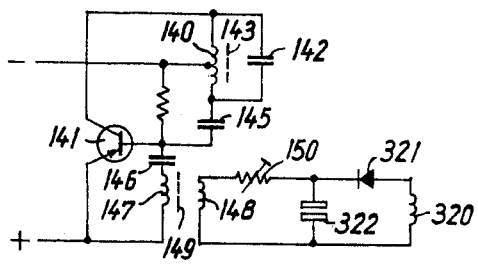
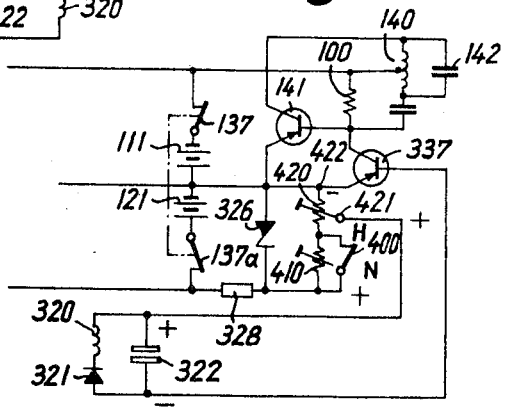
Inventors:
Julian Hartmann
Helmut Moczala
By: Spencer & Kaye
ATTORNEYS

United States Patent Office 3,290,572
Patented Dec. 6, 1966

3,290,572
DIRECT CURRENT MOTOR WITH TRANSISTORIZED POWER SUPPLY
Julian Hartmann, Berlin-Friedenau, and Helmut Moczala, Berlin-Grunewald, Germany, assignors to Licentia Patent Verwaltungs-G.m.b.H., Frankfurt am Main, Germany
Filed July 6, 1964, Ser. No. 380,266
Claims priority, application Germany, July 5, 1963, L 45,270
10 Claims. (Cl. 318—138)

The present invention relates to a direct current (D.C.) motor in which armature coils or windings are connected to a transistorized power supply.

There exist D.C. motors whose armature windings are connected to a transistorized power supply, in which the transistors are controlled by a control circuit as a function of the instantaneous angular position of the rotor relative to the stator. The control circuit is a feed back connection which includes coils and a control transistor and induces control coils which regulate the armature transistors.

As with any motor, the rotational speed can be regulated by means of a centrifugal switch. Such a switch, besides being a relatively expensive piece of equipment, is subject to breakdown and requires a certain amount of maintenance. It is, therefore, the primary object of the present invention to provide a way in which such a centrifugal switch can be eliminated in favor of simpler and far more reliable means. With this basic object in view, the present invention resides in a D.C. motor whose armature windings are connected to a transistorized power supply, in which the armature transistors are controlled by a control circuit in dependence on the instantaneous angular position of the rotor and stator relative to each other, the control circuit being constituted by a feed back connection consisting of coils and a control transistor, and in which, according to the present invention, there is applied to the control circuit a potential which is a function of the rotational speed of the motor and which is generated by a permanent magnetic motor field which rotates with the rotor, such that the control circuit becomes ineffective at a predetermined rotational speed by interrupting the feeding of power to the armature windings.

Additional objects and advantages of the present invention will become apparent upon consideration of the following description when taken in conjunction with the accompanying drawings in which:

FIGURE 4 is a circuit diagram of another embodiment of a motor control arrangement according to the instant invention.

FIGURE 5 is a circuit diagram showing a part of a modified motor control arrangement according to the present invention.

FIGURE 6 is a circuit diagram showing a part of yet another modified motor control arrangement according to the present invention.

Figure 1:
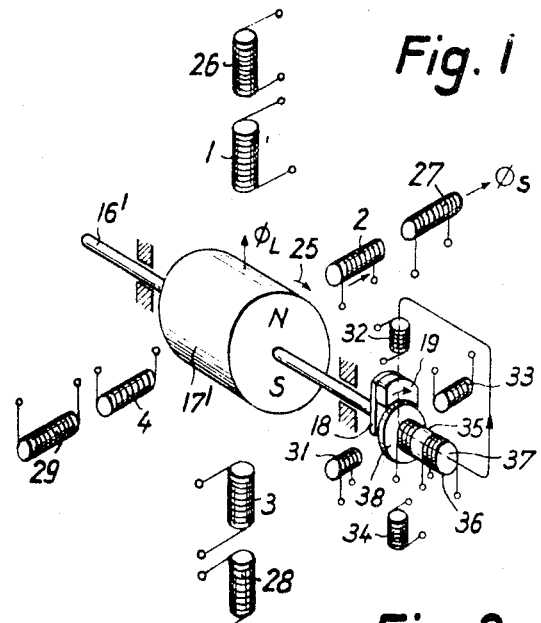
FIGURE 1 is a perspective diagrammatic representation of a motor according to the present invention and shows certain ones of the electromechanical components.
Figure 2:
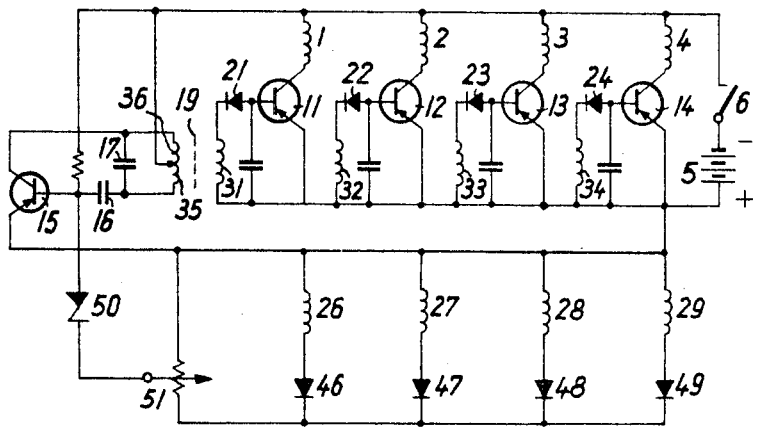
FIGURE 2 is a circuit diagram of the motor control arrangement according to the present invention.

Referring now to the drawing and to FIGURES 1 and 2 thereof in particular, the same shows a rotor 17' mounted on a shaft 16', this rotor being, for the sake of simplicity, represented as a rotating, cylindrical magnet whose polarity is shown at N and S. The stationary armature windings, being the operating windings, are indicated at 1, 2, 3, 4. These windings are connected to transistors 11, 12, 13, 14 (FIGURE 2) which, in accordance with the particular angular position of the magnetic rotor, cause D.C. pulses to flow through the windings, in cyclical sequence, such that the magnet rotor is, as in a rotating field, continuously subjected to an electromagnetic pull or torque, thereby to start the motor and to maintain the rotor in rotation so long as a battery 5 is switched in by closing of a switch 6.

The cyclic sequence of the electronic control of the transistors, these being hereinafter referred to as the armature transistors and which function as controlled switching transistors, is brought about by the motor itself. Mounted on the shaft 16 for rotation therewith is carrier 18 carrying a block 19, made of high-frequency iron or ferrite and having the shape of an arcuate segment. The purpose of this segment 19 is to conduct the magnetic flux of a high-frequency oscillator (this being the feed back), consisting of the coils 35 and 36 which are wound on a core 37, 38, the control transistor 15, and the capacitors 16 and 17, cyclically from core 38 to the cores of the control windings 31, 32, 33, 34. The high-frequency voltage induced in these control windings 31, 32, 33, 34, are rectified by means of respective diodes 21, 22, 23, 24, and are applied, as control voltages, to the bases of the armature transistors 11, 12, 13, 14. The emitter-collector path of each transistor thus remains conductive as long as a control voltage is applied to it, i.e., so long as there is a magnetic flux passing through the respective control coil. The oscillator itself, of course, remains excited so long as the battery 5 is connected to the circuit by means of the switch 6.

The transistor fed D.C. motor could, theoretically, continuously increase its rotational speed until its counter electromotive force is induced in the armature windings, if no provision were made for maintaining a given predetermined rotational speed. According to the present invention, the rotational speed is limited by turning off the oscillator and hence the high-frequency control, this being done by applying to the base of the oscillator transistor a voltage which is proportional to the increasing rotational speed. This voltage will, for the sake of convenience, hereinafter be referred to as a tachometer voltage. Consequently, when there is no longer any regulation, the armature windings 1, 2, 3, 4, will no longer be fed with any current pulses, as a result of which the motor reduces its speed. But as the rotational speed drops, the tachometer voltage, i.e., the voltage which is proportional to the rotational speed of the motor, drops below the blocking voltage of the oscillator transistor, and this will, in a manner of speaking, again turn on the oscillator and the high-frequency control becomes effective once more. The motor therefore again has a driving pulse applied to it. This entire process is repeated, within narrow limits of course, so that the motor will run at what is, for all practical purposes, a constant speed.

The basic components by means of which the rotational speed of the motor is regulated, together with their function, will be explained in conjunction with FIGURES 1 and 2. The cylindrical magnetic rotor 17 serves as the magnetic inductor of the tachometer generator which delivers the tachometer voltage, the same being induced in coils 26, 27, 28, 29, hereinafter referred to as tachometer coils, lying in the same slots as do the working windings 1, 2, 3, 4. The tachometer windings are connected, via respective rectifier diodes 46, 47, 48, 49, and a control potentiometer 51 to the so-called tachometer circuit such that the rectified voltage taken off potentiometer 51 is applied via a Zener diode 50 to the emitter-base path of the oscillator transistor 15, whereat it acts as a blocking voltage. The Zener diode maintains this blocking voltage constant at a value which is precisely of such amplitude as to stop the oscillation.

Figure 3:
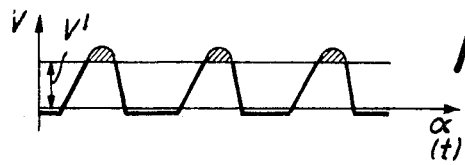
FIGURE 3 is a graph showing the timed relationship of a voltage effective in the motor control circuit according to the present invention.

The graph of FIGURE 3 shows the blocking voltage V which is limited by the Zener diode 50, this being a rectified sinusoidal voltage of a single exciter path of the tachometer generator. The rectified tachometer generator voltage can, for example, be so reduced by the potentiometer that the motor again has to increase its speed until the tachometer generator voltage increases and reaches the blocking voltage, whereupon the motor will be driven at the new, increased rotational speed. If this voltage is increased by the potentiometer, the rotational speed of the motor is reduced. In this way, the nominal r.p.m., i.e., the predetermined rotational speed at which the motor is to run, may be adjusted, within a wide range, by the potentiometer 51.

FIGURE 4 is a circuit diagram of a further example of a motor fed by a transistorized power supply and speed-regulated by a tachometer generator. While the circuit of FIGURE 4 is, in principle, similar to that described above, it differs somewhat in construction. In the circuit of FIGURE 4, the armature transistors 112, 113, 122, 123, are connected to form a bridge circuit having points *a, b, c, d,* the armature windings 110, 120, lying, serially connected, across one diagonal (*b, d*) of the bridge and two batteries 111, 121, being serially connected and lying across the other diagonal (*a, c*).

The circuit includes two ganged switches 137, 137*a,* the former of which connects the negative terminal of the battery 111 to the collectors of the armature transistors 112 and 122, which are connected to point *a* of the bridge. Switch 137 also connects the high-frequency oscillator, which is a conventional feed back connected, transistorized high-frequency generator, connected as a three-point oscillator, to the battery 111, this oscillator being made to oscillate by feed back. The second switch 137*a* connects the positive terminal of battery 121 with the emitters of the armature transistors 113 and 123 which are connected to point *c* of the bridge. The junction of the armature windings 110, 120 is connected to the junction of the batteries 111 and 121, so as to complete the exciter current of the motor. The two armature windings 110, 120 are thus excited by the two batteries by means of the armature transistors which are connected in the bridge circuit. This cyclic excitation, which here, too, is brought about by the magnetic inductive control and thus depends on the rotational speed of the motor, as described in conjunction with FIGURES 1 and 2, is caused by the fact that, during one complete rotor revolution, two current pulses, in opposition, flow through each of the two armature windings. Thus, there will be four current pulses during each revolution, which four pulses create a pulsating, spatial field having the characteristics of a rotary field, it being this field which causes the rotation of the rotor.

As in the case of a commutator-equipped D.C. motor, the motor would, in a constant magnetic field, continue to build up its rotational speed until the counter E.M.F. inducted in the armature is almost equal to the applied voltage—here the voltage of the battery—unless steps are taken to limit the rotational speed earlier. The armature transistors are controlled by the magnetic induction of the control coils 114, 115, 124, 125, in a manner similar to that described in connection with FIGURES 1 and 2. A ferromagnetic, rotating flux-bridging element 144, preferably a ferrite and having an arcuate configuration similar to that of element 19 of FIGURE 1, is represented symbolically, in FIGURE 4, by the dashed line. This element 144 conducts the high-frequency magnetic flux in core 143, the same being a U-shaped yoke, made preferably of a ferrite, which flux is generated by the coil 140 of the resonant circuit of the oscillator, back through the control coils on the yoke. The direction of rotation of the magnetic rotor is given, both for structural and electrical reasons: the direction of rotation is given structurally by the fixed position of the rotor with respect to the element 144 which rotates with the rotor, and the direction of rotation is given for electrical reasons by the direction of the current through the armature windings. Thus, the control coil 114 of FIGURE 4 is subjected to high-frequency magnetic induction through the flux-bridging element 144. The induced high-frequency voltage is rectified by means of a diode 214 and smoothed by a capacitor 314. The thus rectified and smoothed voltage is applied, as a control voltage, to the base-emitter path of the armature transistor 112. The emitter-collector path of armature transistor 112 is thus rendered conductive, so that an exciter current can flow from one terminal of the battery 111 through the armature winding 110 via the emitter-collector path of the armature transistor 112 and the closed switch 137, to the other terminal of battery 111. The armature is now so magnetized by the current flow that its magnetic field is displaced by 90° with respect to the direction of the field of the magnetic rotor. The magnetic rotor thus receives a maximum torque depending on the instantaneous spatial orientation (90°) and on the vectorial magnitude of the magnetic fields. The rotor starts its rotation, for example such that its N pole turns toward the nearest stationary S pole. After a rotation of about 90°, the element 144, which has an arcuate length of 90°, will have interrupted the induction of control coil 114 so that the exciter current through armature winding 110 is likewise interrupted by the blocked armature transistor 112. The edge of the element 144, which, during the rotation, moves over the control coil 125, starts the inductive excitation of the control coil 125, while the trailing edge of the element will, after a further rotation of 90°, interrupt the inductive excitation of the control coil 125. It will thus be seen that throughout each quarter revolution of the magnetic rotor one particular control coil will remain excited, as does the corresponding armature transistor. In FIGURE 4 it is now the armature transistor 123 which is conductive, since a high-frequency voltage is induced in control coil 125, this voltage being a rectified control voltage which, after having been rectified by diode 225, appears across capacitor 325 and the emitter-base path of the armature transistor 123. The exciter current thus flows through the following: the positive terminal of battery 121 is connected, via the closed switch 137*a,* with the emitter-collector path of the armature transistor 123, whose collector, in turn, is connected via armature winding 120 to the negative terminal of battery 121. The exciter current through the armature winding 120 induces an armature field in the direction of the arrow. The arrow head is intended, for example, to represent the S pole of a stationary armature field, the N pole of the magnetic rotor—which at this instant is vertically oriented—rotating in clock-wise direction with respect to the armature field. As the N pole of the magnetic rotor then assumes its horizontal position, i.e., when it assumes the position as the S pole of the armature, the horizontal armature field is eliminated due to the switching effect by the element 144. There is thus obtained, by induction of the control coil 115 and excitation of the armature winding 110 via the armature transistor 113, a vertical, stationary armature field in the direction of the arrow shown in dashed lines. The current is supplied from battery 121. It is believed to be unnecessary to describe the current flow since this is readily apparent from FIGURE 4, depending on which armature transistor is just being excited by its control circuit. The S pole of the instantaneous, vertical armature field is, by agreement, at the top of the arrow head of the dashed arrow. The instantaneous N pole of the magnetic rotor occupies the position of the previous S pole of the horizontal armature field which has just been eliminated. The magnetic rotor is turned, in clock-wise direction, such that its N pole is in the vertical position of the excited S pole of the armature field. The vertical positioning of the N pole of the magnetic rotor eliminates the vertical armature S pole and is again excited, due to the change-over effected by the element 144, via the control coil 124, the diode 224, the transistor 122 and the armature winding 120, to a position represented by the rightwardly pointing, horizontal dashed arrow. After a further rotation of 90°, in clock-wise direction, the magnetic rotor will have completed one complete revolution, and the rotor will continue to rotate, so long as the ganged switches 137, 137a, remain closed, with the armature being excited in the cyclic manner described above.

As described above, the rotational speed of the motor is limited by means of a tachometer voltage. The tachometer windings 310, 320 of FIGURE 4, in which the tachometer voltage is induced by the N-S rotor magnet, will, in practice and as explained above in conjunction with FIGURES 1 and 2, lie in the same grooves as the armature windings 110, 120. The induced tachometer A.C. voltage is rectified by the diodes 311 and 321 and smoothed by capacitor 322. The potentiometer 323 completes the tachometer circuit and allows the tachometer to be adjusted so that the motor speed may be regulated to any desired value. The adjustable tachometer voltage is applied, via a Zener diode 326, to the emitter-base circuit of a transistor 327, which, in this circuit, operates as a current amplifier. As and when the tachometer voltage taken off potentiometer 323 has reached the threshold voltage of the Zener diode, such voltage is also applied to the base of the transistor 327 so that its emitter-collector path becomes conductive. The positive voltage of battery 121 is now applied to the base of the oscillator transistor 141 which, up to now, was connected solely to the negative terminal of battery 111 via a resistor 100. The base of the oscillator transistor 141 thus becomes currentless, as a result of which the oscillator frequency voltage is no longer generated. The motor is thus no longer controlled and energized so that its rotational speed drops. But this, in turn, drops the voltage applied to the Zener diode below the threshold voltage thereof, whereupon the oscillator is once more activated, which brings with it the control and energization of the motor. This process continues so that the motor is regulated to run at a certain speed, depending on the setting of the potentiometer 323.

The speed regulation obtained with the circuit of FIGURE 4 represents an improvement over that obtained with the arrangement of FIGURES 1 and 2 in that there is included a transistor 327 which has a greater effect on the oscillator. This, in turn, means that the tachometer itself draws less power so that the over-all efficiency of the motor is increased, due to the fact that the tachometer is called upon to deliver but very little power. For all practical purposes, the power drawn by the tachometer is equal to the square of the particular tachometer voltage divided by the high-ohmic resistance of the potentiometer 323. When the emitter-collector path of the transistor is conductive, the resistor 100 has a D.C. voltage applied to it, which corresponds to the sum of the voltages of the serially connected batteries 111, 121. The resistor 100 is suitably designed insofar as its heat dissipation is concerned.

FIGURE 5 shows a circuit by means of which the motor can be made to run at either one of two different regulated rotational speeds. The emitter-collector path of transistor 337 becomes conductive at a given tachometer D.C. voltage, thereby short-circuiting the emitter-base path of the oscillator transistor 141. When the ganged switches 137, 137a, are closed, the battery 121 is connected to the Zener diode 326 via a limiting resistor 328. The voltage applied to the Zener diode now remains constant with respect to the higher battery voltage, which, however, may fluctuate during operation of the motor. The stablized voltage of the Zener diode is applied to a voltage divider which comprises a variable resistor 410, the same being connected in parallel with a switch 400, and a serially connected variable potentiometer 420. If the motor is to run at the higher of its two speeds, the switch is moved to its closed position H, thereby short-circuiting the resistor 410. Consequently, the stabilized divided voltage taken off potentiometer 420, i.e., across terminals 421 and 422, is relatively large, and the terminal 421 is positive with respect to the terminal 422, the latter being connected to the emitter of the transistor 337. The tachometer voltage, which is induced, during the rotation of the motor, in tachometer winding 320, and is rectified by diode 321 and smoothed by capacitor 322, now has its polarity (see the + and − symbols) so connected in opposition to the stabilized tapped voltage that it becomes effective for opening the transistor 337 only when it has reached, and, more accurately, surpassed, the voltage taken off across the emitter and potentiometer slide. It will be seen that the amplitude of the positive voltage taken off potentiometer 420 is a measure of the greater of the two rotational speeds to which the motor is to be regulated.

The motor is regulated to run at the lower of the two speeds by opening the switch 400, i.e., by moving it to the position N. The resistor 410, which is adjusted to the particular low speed desired, is now effective and the voltage which was heretofore set at the potentiometer is now reduced due to the increased voltage division. Due to the now greatly excessive tachometer counter voltage, the transistor will remain in its blocked state. The stator windings of the motor receive no current so that the speed of the motor drops. This speed reduction continues until the tachometer voltage becomes so low that there is no emitter-base current in transistor 337. The motor will then have assumed the lower of its two speeds.

In this circuitry, the tachometer generator operates practically without power inasmuch as its induced control voltage is exactly proportional to the motor r.p.m. and compensates one, or more, stabilized control voltages.

The circuit of FIGURE 6 includes an oscillator which, as in the case of the above embodiments, has the conventional feed back three-point connection. A portion of the high-frequency energy in the resonant circuit 140, 142, is applied as feed back, via capacitor 145, to the base-emitter path of the transistor 141. This controls the transistor 141 and hence maintains the high-frequency oscillation. Connected in parallel with the base-emitter path of transistor 141 is the series connection of a capacitor 146 and a choke coil 147, the latter being wound on a ferrite core 149. This core is excited with direct current, by means of a further coil 148 and an adjustable resistor 150, by the tachometer generator of the motor, until, when a certain rotational speed is reached, the current will have increased to the point at which the core is electromagnetically saturated and the inductance of choke coil 147 disappears almost completely. The saturated choke coil offers no impedance to the feed back voltage, so that the same is short-circuited, across the emitter-base path of the transistor 141, via the capacitor 146 and the now inductanceless choke coil 147. There is no oscillator frequency since the saturated iron core choke coil short-circuits the feed back voltage for the oscillator transistor.

The rotational speed is increased by increasing the variable resistor 150, as a result of which the saturation current for the choke will not be attained until the tachometer voltage is greater.

The saturable choke together with its coils 147, 148, can be eliminated if the saturation coil 148 is wound on the ferrite core 143 next to the resonant circuit coil 140 of the oscillator. The capacitor 146 can then also be dispensed with. In such a circuit, the core 143 is electromagnetically saturated so that the inductance of the resonant circuit coil 140 is reduced to zero, thereby eliminating the high-frequency oscillations.

It will be understood that the above description of the present invention is susceptible to various modifications, changes, and adaptations, and the same are intended to be comprehended within the meaning and range of equivalents of the appended claims.

What is claimed is:

1. In a D.C. motor having a stator and a rotor, the combination which comprises: means forming armature windings; a power supply having armature transistors connected to said windings; a control circuit connected to said armature transistors for controlling the same in dependence on the relative angular position between the stator and rotor, said control circuit being an oscillatory circuit incorporating a control transistor; means for producing a permanent magnetic motor field which rotates with the rotor; and speed regulating means connected to said control circuit for applying thereto a tachometer potential, which is generated by the inductor action of said magnetic motor field, which potential renders said control circuit ineffective at a given predetermined rotational speed by interrupting the feeding of power to said armature windings.

2. The combination defined in claim 1 wherein said speed regulating means are connected to apply said tachometer potential to the base circuit of said control transistor.

3. The combination defined in claim 1 wherein said armature windings are arranged in grooves of said armature, and wherein said speed regulating means include tachometer winding means arranged in said grooves.

4. The combination defined in claim 1 wherein said speed regulating means include a Zener diode the output of which constitutes said tachometer potential.

5. The combination defined in claim 1 wherein said speed regulating means include an amplifier transistor the output of which is applied to the base circuit of said control transistor.

6. The combination defined in claim 1 wherein said speed regulating means are connected to said control circuit via a saturable choke, and wherein said speed regulating means, upon attainment of said predetermined rotational speed, apply to said choke a potential which saturates said choke and renders said control circuit ineffective.

7. The combination defined in claim 1 wherein said speed regulating means include an intermediate transistor connected to said control circuit for short-circuiting the same upon attainment of said predetermined rotational speed.

8. The combination defined in claim 7 wherein said speed regulating means include a tachometer winding which is connected in series with and acts in opposition to a source of voltage constituting a bias, the base-emitter circuit of said intermediate transistor being connected across said bias such that upon attainment of said predetermined rotational speed said tachometer potential put out by said tachometer winding exceeds said bias.

9. The combination defined in claim 1 wherein said regulating means render said control circuit ineffective at either one of two given predetermined rotational speeds, said regulating means including a battery, a stabilizing resistor connected across said battery, two serially connected resistors connected across said battery, a tachometer winding, said tachometer winding lying in series with one of said two serially connected resistors, said one resistor being adjusted to regulate the higher of the two speeds, a switch connected across the other of said two serially connected resistors, said other resistor being adjusted to a value such that it, together with the resistance of said one resistor, provides the effective resistance for speed regulation at the lower of the two speeds when said switch is open, in consequence of which the motor may be regulated to run at either of said two speeds by opening or closing said switch.

10. In a D.C. motor having armature windings, means for producing a permanent magnetic motor field which rotates with the rotor, a power supply having armature transistors connected to said windings, and a control circuit connected to said armature transistors for controlling the same in dependence on the relative angular position between the stator and rotor, said control circuit being a feed back circuit incorporating coils and a control transistor, the improvement which comprises rotational speed regulating means connected to said control circuit for applying thereto a potential which is generated by the inductor action of said magnetic motor field, which potential renders said control ineffective at a given predetermined rotational speed by interrupting the feeding of power to said armature windings.

References Cited by the Examiner

UNITED STATES PATENTS 2,814,769  11/1957  Williams _____ 318—138 X
3,124,733  3/1964   Andrews _____ 318—259 X
3,175,140  3/1965   Hogan et al. _____ 318—138 X

FOREIGN PATENTS 641,003  1/1937  Germany.

ORIS L. RADER, Primary Examiner.

G. SIMMONS, Assistant Examiner.